United States Patent
Irie

(10) Patent No.: US 12,517,186 B2
(45) Date of Patent: Jan. 6, 2026

(54) BATTERY SYSTEM

(71) Applicant: TOYOTA JIDOSHA KABUSHIKI KAISHA, Toyota (JP)

(72) Inventor: Takayuki Irie, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 154 days.

(21) Appl. No.: 18/488,345

(22) Filed: Oct. 17, 2023

(65) Prior Publication Data

US 2024/0241187 A1  Jul. 18, 2024

(30) Foreign Application Priority Data

Jan. 17, 2023 (JP) ................ 2023-005306

(51) Int. Cl.
   *G01R 31/392* (2019.01)
   *G01R 31/3842* (2019.01)
   *G01R 31/396* (2019.01)

(52) U.S. Cl.
   CPC ....... *G01R 31/392* (2019.01); *G01R 31/3842* (2019.01); *G01R 31/396* (2019.01)

(58) Field of Classification Search
   CPC .............. G01R 31/392; G01R 31/3842; G01R 31/396; G01R 31/389; G01R 31/382; Y02E 60/10; H01M 10/425; H01M 10/482; H01M 10/486; H01M 10/4285; H01M 10/443
   See application file for complete search history.

(56) References Cited

U.S. PATENT DOCUMENTS

| | | | |
|---|---|---|---|
| 2014/0172332 A1* | 6/2014 | Johnson | G01R 31/3648 702/63 |
| 2018/0261889 A1* | 9/2018 | Kusano | H01M 10/44 |

FOREIGN PATENT DOCUMENTS

| | | |
|---|---|---|
| JP | 2001-210386 A | 8/2001 |
| JP | 2007-078661 A | 3/2007 |
| JP | 2014-107929 A | 6/2014 |
| JP | 2018-006029 A | 1/2018 |
| JP | 2022-111574 A | 8/2022 |
| KR | 10-2023-0001440 A | 1/2023 |

OTHER PUBLICATIONS

D Li et al 2021 IOP Conf. Ser.: Mater. Sci. Eng. 1043 052035 (Year: 2021).*

* cited by examiner

*Primary Examiner* — Daniel R Miller
(74) *Attorney, Agent, or Firm* — SoraIP, Inc.

(57) ABSTRACT

A battery system includes a monitoring unit configured to detect voltages, currents, and temperatures of cells included in a battery. An ECU increments a count value when an SOC variation among the cells becomes larger than a threshold, based on the detection results of the monitoring unit. The ECU increments a count value when a positive electrode potential of the cell becomes lower than a threshold, based on the detection result of the monitoring unit. The ECU diagnoses that the battery is degraded when the amount of change in any of the count values becomes equal to or larger than a predetermined value.

2 Claims, 6 Drawing Sheets

BATTERY SYSTEM

CROSS-REFERENCE TO RELATED APPLICATION

This application claims priority to Japanese Patent Application No. 2023-005306 filed on Jan. 17, 2023, incorporated herein by reference in its entirety.

BACKGROUND

1. Technical Field

The present disclosure relates to battery systems.

2. Description of Related Art

Japanese Unexamined Patent Application Publication No. 2022-111574 (JP 2022-111574 A) discloses a battery system that diagnoses degradation of a battery including a plurality of blocks connected in parallel, by using a variation in state of charge (SOC) among the blocks and the positive electrode potential of each block. The battery system described in JP 2022-111574 A diagnoses whether the battery has a degrading tendency based on the number of times (frequency) the SOC variation among the blocks becomes larger than a predetermined amount within a predetermined time and the number of times (frequency) the positive electrode potential of any block becomes equal to or less than a prescribed potential within the predetermined time.

SUMMARY

When a temperature variation among cells of a battery is large, an SOC variation among the cells fluctuates. Therefore, the SOC variation among the cells may become larger than a predetermined value even if the battery is not degraded. Moreover, depending on the mode of use of the battery, the positive electrode potentials of the cells may become equal to or less than a prescribed potential even if the battery is not degraded. Accordingly, when degradation of the battery is diagnosed based on the number of times the SOC variation among the cells becomes larger than the predetermined value, the number of times the positive electrode potential of any cell becomes equal to or less than the prescribed potential, etc., erroneous diagnosis may occur.

It is an object of the present disclosure to accurately diagnose degradation of a battery.

(1) A battery system according to the present disclosure includes: a battery composed of a plurality of cells connected together; and a control device configured to diagnose a degradation state of the battery.
The control device of the battery system includes a parameter calculation unit configured to repeatedly calculate a parameter indicating degradation of the battery, a comparison unit configured to compare the parameter with a threshold, a count unit configured to increment a count value based on a comparison result between the parameter and the threshold, an amount-of-change calculation unit configured to calculate an amount of change in the count value, and a diagnosis unit configured to determine that the battery is degraded when the amount of change becomes equal to or larger than a predetermined value.

According to this configuration, the parameter calculation unit repeatedly calculates the parameter indicating the degradation of the battery. For example, the parameter indicating the degradation of the battery may be an SOC variation among the cells or may be a positive electrode potential of the cell. The comparison unit compares the parameter indicating the degradation of the battery with the threshold. The count unit increments the count value based on the comparison result between the parameter and the threshold.

The amount-of-change calculation unit calculates the amount of change in the count value. The amount of change in the count value is an amount representing the slope of the count value, and is an amount representing the slope of a trajectory of the count value. For example, the amount of change in the count value may be the count value divided by the cumulative usage time (cumulative operating time) of the battery, or may be an amount of increase in the count value per predetermined usage time (per predetermined operating time). In the case where the battery is mounted on a vehicle, the amount of change in the count value may be the count value divided by the cumulative travel distance, or may be an amount of increase in the count value per predetermined travel distance.

When the amount of change in the count value becomes equal to or larger than the predetermined value, the diagnosis unit determines that the battery is degraded. When the degradation of the battery progresses and the count value is continuously incremented and as a result the amount of change in the count value becomes equal to or larger than the predetermined value, it is diagnosed that the battery is degraded. This configuration reduces erroneous diagnosis when the temperature variation among the cells of the battery is large, and also reduces erroneous diagnosis due to the mode of use of the battery. It is therefore possible to accurately diagnose the degradation of the battery.

(2) The parameter indicating the degradation of the battery may be an SOC variation among the cells, and the count unit may be configured to increment the count value by one when the SOC variation is larger than the threshold.

According to this configuration, when the SOC variation among the cells, for example, the difference between the highest and lowest SOC values of the cells in the battery, is larger than the threshold, the count value is incremented by one. As the battery is degraded, the SOC variation among the cells increases. Therefore, the SOC variation among the cells can be used as the parameter indicating the degradation of the battery.

(3) In (2) described above, the control device may be configured to calculate a temperature variation among the cells and set the threshold based on the temperature variation.

According to this configuration, the threshold is set based on the temperature variation among the cells. The temperature variation may be, for example, the difference between the highest and lowest temperatures of the cells in the battery. When the temperature variation among the cells is large, the SOC variation among the cells tends to increase even if the battery is not degraded. Setting the threshold based on the temperature variation among the cells makes it possible to more accurately diagnose degradation of the battery.

(4) In (2) and (3) described above, the diagnosis unit may be configured not to diagnose the degradation of the battery when the amount of change is in a decreasing direction.

According to this configuration, the degradation of the battery is not diagnosed when the amount of change in the count value is in the decreasing direction. The memory effect develops particularly when the cells are nickel metal hydride cells or nickel cadmium cells. When the memory effect develops, open circuit voltage (OCV) characteristics vary among the cells. Therefore, the amount of change in the count value using the SOC variation among the cells may increase even if the battery is not degraded.

The memory effect is saturated (the amount of decrease in OCV of the cell due to the memory effect is saturated) when the cell has been in use for a period of time and the cell has been repeatedly charged and discharged. Therefore, the amount of change in the count value shows a decreasing tendency from when the memory effect develops until the memory effect is saturated. Since the degradation of the battery is not diagnosed when the amount of change in the count value is in the decreasing direction, it is possible to reduce erroneous diagnosis due to the memory effect.

(5) The parameter indicating the degradation of the battery may be a positive electrode potential of each of the cells, and the count unit may be configured to increment the count value by one when the positive electrode potential is lower than the threshold.

According to this configuration, when the positive electrode potential of the cell is lower than the threshold, the count value is incremented by one. Particularly when the cells are nickel metal hydride cells, the positive electrode potential of the cell decreases as the battery is degraded. Therefore, the positive electrode potential of the cell can be used as the parameter indicating the degradation of the battery.

According to the present disclosure, it is possible to accurately diagnose degradation of a battery.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
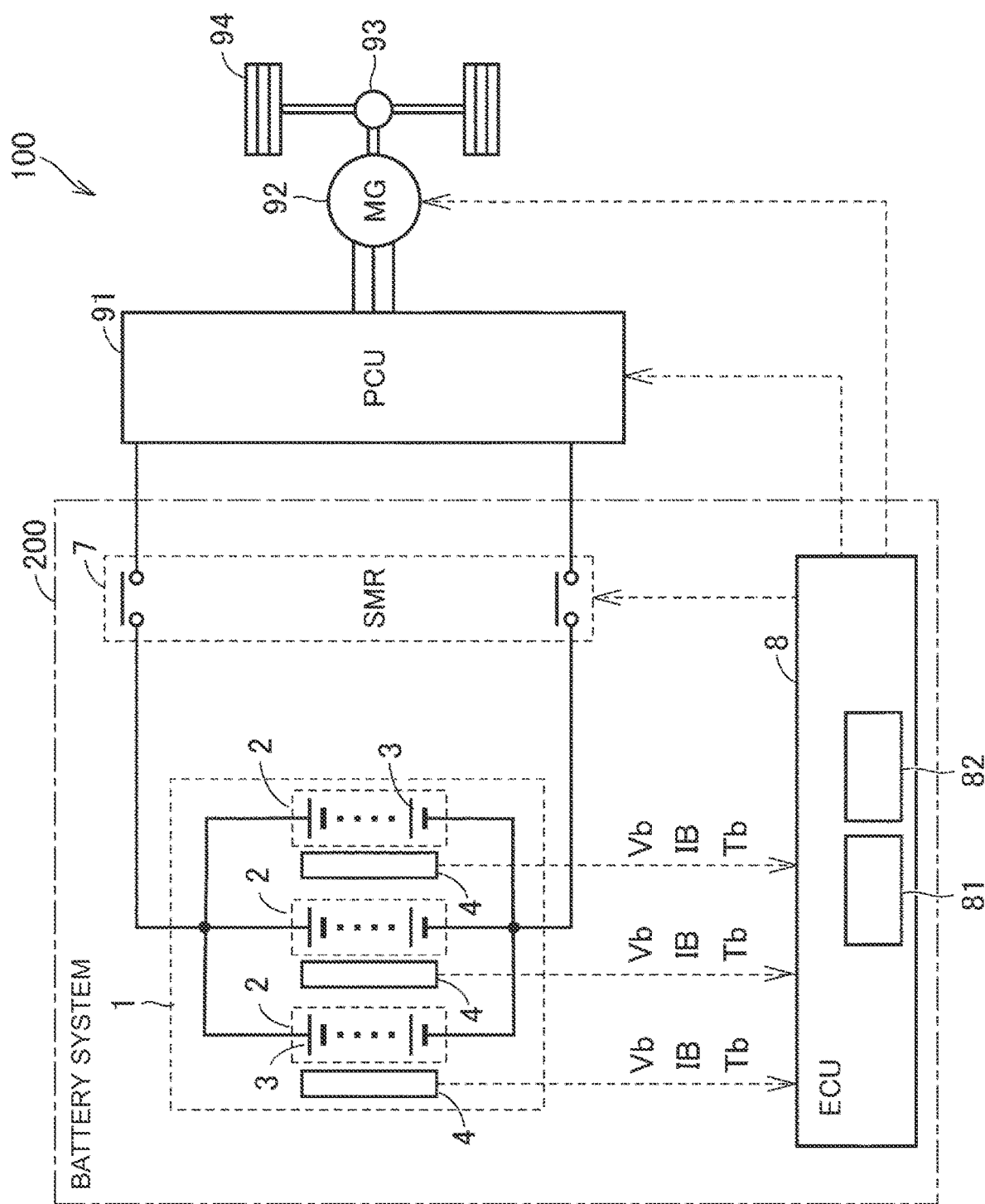
FIG. 1 is a block-diagram schematically illustrating an entire configuration of an electrified vehicle in which a battery system according to an embodiment of the present disclosure is mounted.

Hereinafter, embodiments of the present disclosure will be described in detail with reference to the drawings. It should be noted that the same or corresponding portions in the drawings are designated by the same reference signs and repetitive description will be omitted.

Hereinafter, a configuration in which the battery system according to the embodiment of the present disclosure is mounted on an electrified vehicle will be described. Electrified vehicle may be hybrid electric vehicle (plug-in hybrid electric vehicle), a battery electric vehicle, or a fuel cell electric vehicle. Further, the use of the battery system is not limited to the vehicle, and may be stationary.

FIG. 1 is a block-diagram schematically illustrating an entire configuration of an electrified vehicle in which a battery system according to an embodiment of the present disclosure is mounted. The vehicle 100 includes a battery system 200. The battery system 200 includes a battery pack 1. The battery pack 1 includes a plurality of batteries 2 connected in parallel to each other. Each of the plurality of batteries 2 includes a plurality of cells (battery cells: unit cells) 3 connected in series. Each of the batteries 2 is provided with a monitoring unit 4. The battery system 200 further comprises a System Main Relay (SMR) 7 and a control device electronic control unit (ECU) 8. The vehicle 100 further includes a Power Control Unit (PCU) 91, a motor generator 92, a power transmission gear 93, and drive wheels 94.

The battery pack 1 is a DC power supply that can be recharged. Although the number of batteries 2 in the battery pack 1 is three in FIG. 1, the present disclosure is not limited to this. The battery 2 may include any number of cells 3, and the number of cells 3 may be, for example, 54. The battery pack 1 may not be composed of a plurality of batteries 2 connected in parallel, but may be composed of a single battery 2. In this case, the number of cells 3 in the battery 2 may be, for example, 168.

In the present embodiment, the cell 3 is a unit cell that is a nickel metal hydride cell. The cell 3 is, for example, a rectangular sealed cell, and includes an electrode body and an electrolytic solution housed in a case. The electrode assembly includes a positive electrode, a negative electrode, and a separator. Various materials known in the art can be used as the material of the electrode body and the electrolytic solution. As an example, the positive electrode includes a positive electrode active material layer including nickel hydroxide ($Ni(OH)_2$ or $NiOOH$) and an active material support such as expanded nickel. The negative electrode includes a hydrogen storage alloy. As the separator, a nonwoven fabric made of hydrophilized synthetic fibers is used. As the electrolyte solution, an alkaline aqueous solution containing potassium hydroxide (KOH), sodium hydroxide (NaOH), or the like is used.

The monitoring unit 4 detects the voltage Vb of each cell 3, the current IB flowing through the battery 2 (flowing through each cell 3), and the temperature Tb of each cell 3.

The SMR 7 is electrically connected to a power line connecting the battery pack 1 and the PCU 91. The SMR 7 is opened and closed in response to a control command from ECU 8. When the SMR 7 is closed, power may be exchanged between the battery pack 1 and the PCU 91.

ECU 8 includes a processor 81, such as Central Processing Unit (CPU), memories 82, such as Read Only Memory (ROM) and Random Access Memory (RAM), and input/output ports (not shown). The processor 81 controls each device such that the vehicle 100 and the battery system 200 are in a desired state based on the signals received from each sensor and the maps and programs stored in the memory 82. As a main process executed by ECU 8 in the present embodiment, a "degradation diagnosis process" of the battery 2 is exemplified.

PCU 91 includes inverters and converters. When the battery pack 1 is discharged, the converter boosts the voltage supplied from the battery pack 1 and supplies the boosted voltage to the inverter. The inverter converts DC power supplied from the converter into AC power and drives the motor generator 92. On the other hand, when the battery pack 1 is charged, the inverter converts AC power generated by the motor generator 92 into DC power and supplies the DC power to the converter. The converter lowers the voltage supplied from the inverter and supplies the voltage to the battery pack 1.

The motor generator 92 is, for example, a three-phase AC rotating electric machine. The output torque of the motor generator 92 is transmitted to the drive wheels 94 via the power transmission gear 93. The motor generator 92 can generate electric power by the rotational force of the drive wheels 94 at the time of regenerative braking of the vehicle 100.

Figure 2:
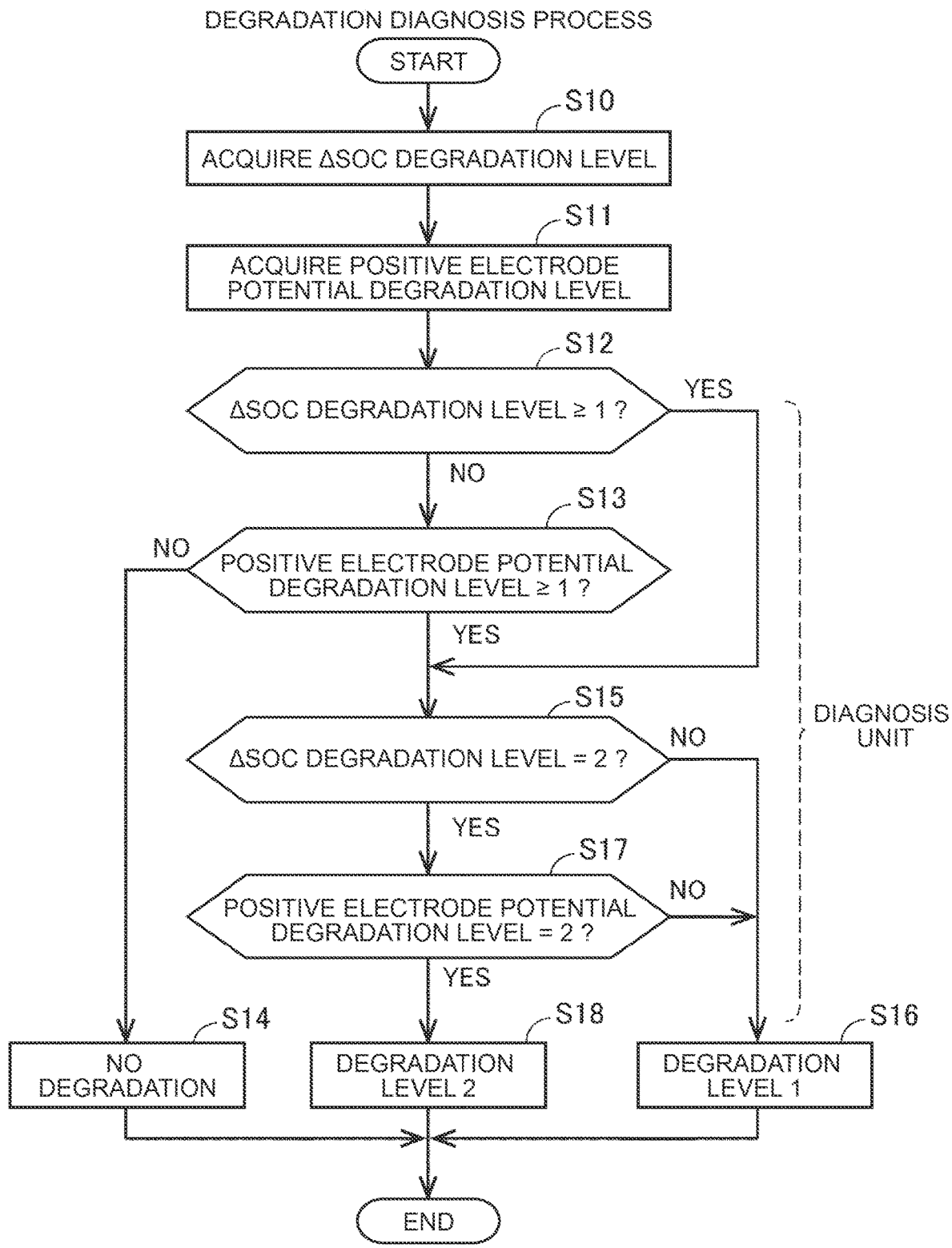
FIG. 2 is a flowchart illustrating a processing procedure of the degradation diagnosis processing according to the present embodiment.

FIG. 2 is a flowchart illustrating a processing procedure of the degradation diagnosis processing in the present embodiment. This flowchart is executed, for example, when a predetermined condition is satisfied. The respective processes are realized by software processing by a ECU 8 which is a control device, but may be realized by hardware (electric circuitry) arranged in a ECU 8.

The degradation diagnosis process according to the present embodiment is a process of diagnosing degradation of the battery 2 from the viewpoint of the SOC variation among the cells 3 and the viewpoint of the amount of decrease in positive electrode potential of the cell 3. The degradation diagnosis process is executed for each battery 2. First, in step (hereinafter, step is abbreviated as "S") 10, a ΔSOC degradation level is obtained. The ΔSOC degradation level is the degradation level of the battery 2 diagnosed based on the SOC variation among the cells 3 in the battery 2.

Figure 3:
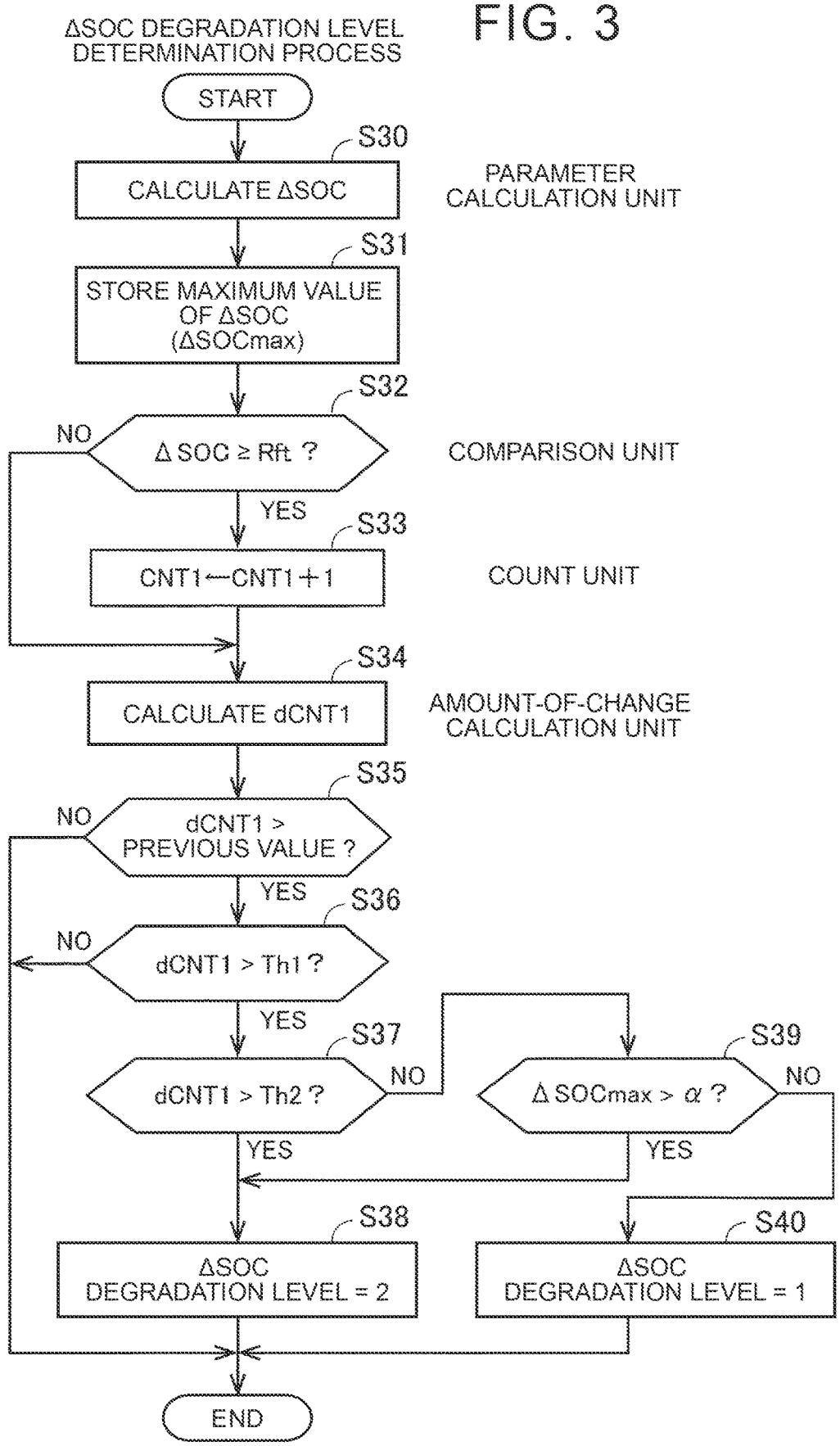
FIG. 3 is a flowchart illustrating a procedure of the ΔSOC degradation level determination process.

FIG. 3 is a flowchart illustrating a procedure of the ΔSOC degradation level determination process. This processing is executed, for example, by being called from the main routine at predetermined intervals.

In FIG. 3, first, in S30, SOC variation (ΔSOC) among the cells 3 is calculated. In the present embodiment, the SOC of each cell 3 is obtained from SOC-OCV characteristics by using the voltage Vb of the cell 3 detected by the monitoring unit 4. Note that SOC may be obtained by using the coulomb counting method using the current IB in combination. Then, the difference between the maximum value SOCmax of SOCs of the cells 3 in the battery 2 and the minimum value SOCmin of the SOCs of the cells 3 in the battery 2 is calculated as ΔSOC (ΔSOC=SOCmax−SOCmin). In the following S31, the largest value of ΔSOC (ΔSOCmax) is stored. For example, when the ΔSOC calculated by the present routine is larger than the stored ΔSOCmax, the ΔSOCmax is rewritten (updated) to the ΔSOC calculated this time.

In S32, it is determined whether the ΔSOC calculated by S30 is equal to or larger than the threshold Rft. The threshold Rft is set based on the temperature variation among the cells 3 in the battery 2.

Figure 4:
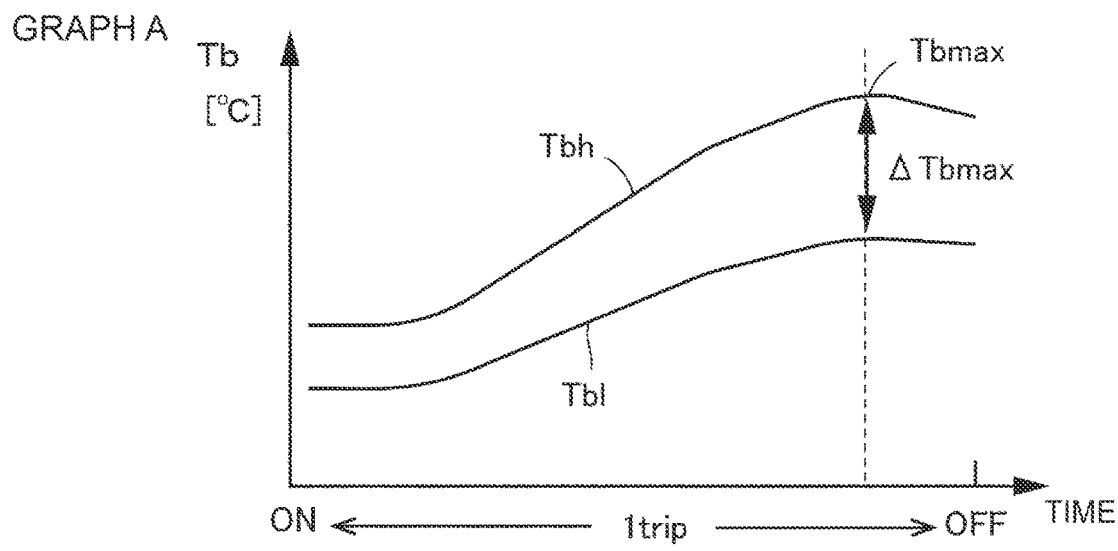
FIG. 4 is a diagram for explaining how to set a threshold Rft by graph A, graph B, and graph C.
Figure 4:
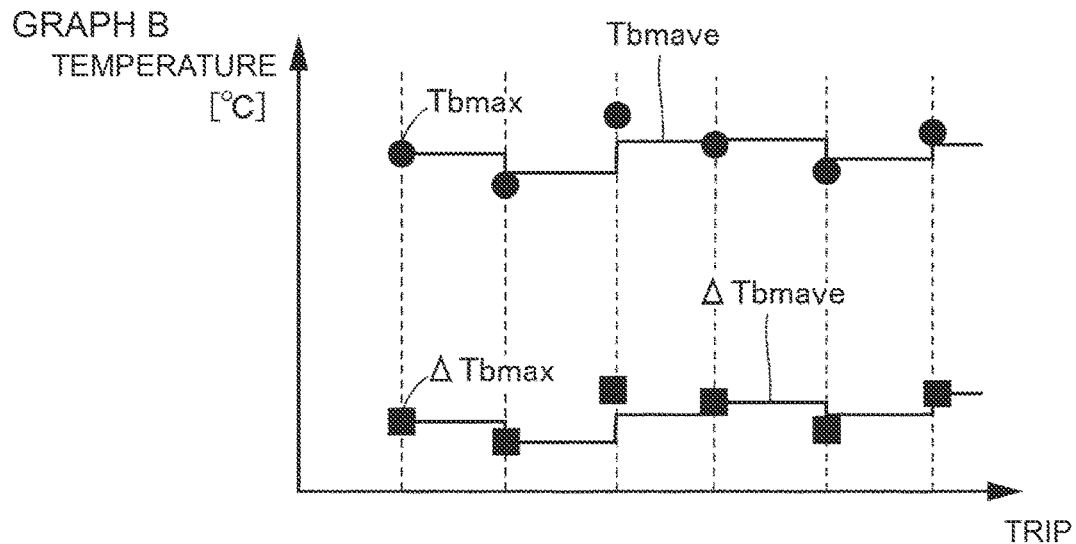
Figure 4:
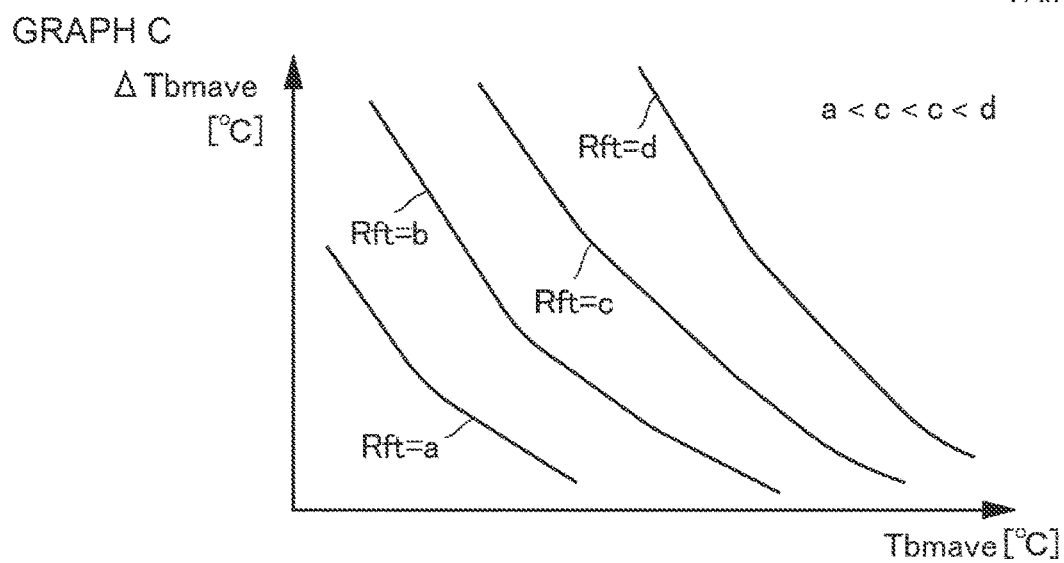

FIG. 4 is a diagram illustrating how to set the threshold Rft. When the temperature variation among the cells 3 is large, ΔSOC among the cells 3 tends to increase even if the battery 2 is not degraded. Setting the threshold Rft based on the temperature variation among the cells 3 makes it possible to more accurately diagnose degradation of the battery 2.

Graph A of FIG. 4 shows the temperature Tb of the cell 3 during the trip of the vehicle 100. The trip is a time period from when the power switch (ignition switch) is turned ON to when the vehicle starts traveling until when the power switch is turned OFF to when the vehicle finishes traveling. Graph A of FIG. 4 shows the transition of the temperature Tbh of the cell 3 having the highest temperature and the transition of the temperature Tbl of the cell 3 having the lowest temperature among the cells 3 in the battery 2. In the present embodiment, each time the trip is completed, the temperature at which the temperature Tbh becomes the highest is stored as the current maximum temperature (Tbmax). The difference between the temperature Tbh and the temperature Tbl at that time is stored as the present temperature variation (ΔTbmax).

Graph B in FIG. 4 shows the transition of the cumulative mean of Tbmax (Tbmave) and the cumulative mean of ΔTbmax (ΔTbmave). As shown in graph B of FIG. 4, each time the trip of the vehicle 100 ends, the arithmetic mean of the stored Tbmax is calculated and stored as a Tbmave. In addition, each time the trip of the vehicle 100 ends, the arithmetic average of the stored ΔTbmax is calculated and stored as ΔTbmave.

Graph C of FIG. 4 shows a calculation map of the threshold Rtf. In graph C of FIG. 4, the vertical axis is ΔTbmave, the horizontal axis is Tbmave. The threshold Rtf is set to be larger as ΔTbmave is larger and as Tbmave is larger. Each time S32 is processed, the threshold Rtf is calculated from the current ΔTbmave and the current Tbmave using the calculation map shown in graph C of FIG. 4.

Referring back to FIG. 3, in S32, ΔSOC is compared with the threshold Rtf set based on the temperature variation (ΔTbmax) among the cells 3. When ΔSOC is equal to or larger than the threshold Rtf, an affirmative determination is made and the process proceeds to S33. When ΔSOC is smaller than the threshold Rtf, a negative determination is made and the process proceeds to S34.

In S33, the count value CNT1 is incremented, and the process proceeds to S34. The initial value of the count value CNT1 is 0 and is incremented each time S33 is executed. When the battery 2 is replaced, the count value CNT1 is reset to 0.

In S34, the amount of change dCNT1 of the count value CNT1 is calculated. The amount of change dCNT1 is an amount representing the slope of the count value CNT1. In the present embodiment, the count value CNT1 divided by the cumulative travel distance Mc of the vehicle 100 is calculated as the amount of change dCNT1 (dCNT1=CNT1/Mc). The amount of change dCNT1 may be an amount of increase in the count value CNT1 per predetermined travel distance. For example, when the count value CNT1 a certain travel distance Mo before the present time (this time) is CNT1o, the count value may be calculated from "dCNT1=(CNT1−CNT1o)/Mo". The amount of change dCNT1 may be the count value CNT1 divided by the cumulative usage time Tc of the battery 2 (dCNT1=CNT1/Tc). In addition, the amount of change dCNT1 may be an amount of increase in the count value CNT1 per predetermined usage time. For example, when the count value CNT1 a certain usage time To before the present time (this time) is CNT1to, it may be calculated from "dCNT1=(CNT1−CNT1to)/To."

In the following S35, it is determined whether the amount of change dCNT1 is larger than the previous value. The previous value is the value of the amount of change dCNT1 when this routine is processed last time. If the amount of change dCNT1 is larger than the previous value, an affirmative determination is made and the process proceeds to S36. When the amount of change dCNT1 is equal to or less than the previous value, a negative determination is made, and the current routine ends.

In S36, it is determined whether the amount of change dCNT1 is larger than the threshold Th1. When the amount of change dCNT1 is larger than the threshold Th1, an affirmative determination is made and the process proceeds to S37. When the amount of change dCNT1 is equal to or less than the threshold Th1, a negative determination is made, and the current routine ends.

In S37, it is determined whether the amount of change dCNT1 is larger than the threshold Th2. The threshold Th2 is set to be larger than the threshold Th1 (Th2>Th1). When the amount of change dCNT1 is larger than the threshold Th2, an affirmative determination is made, and the process proceeds to S38. In S38, the ΔSOC degradation level of the battery 2 is set to "2," and the current routine ends. When the amount of change dCNT1 is equal to or less than the threshold Th2, a negative determination is made and the process proceeds to S39.

In S39, it is determined whether or not ΔSCOmax is larger than a predetermined value α. When ΔSOCmax is larger than the predetermined value α, an affirmative determination is made and the process proceeds to S38. In S38, the degradation level of the battery 2 is set to "ΔSOC degradation level 2," and the current routine ends. When ΔSOCmax is equal to or less than the predetermined value α, the process proceeds to S40. In S40, the ΔSOC degradation level of the battery 2 is set to "1," and the current routine ends.

Returning to FIG. 2, in S11, the positive electrode potential degradation level is acquired. The positive electrode potential degradation level is a degradation level of the battery 2 diagnosed based on a decrease in the positive electrode potential of the cell 3 in the battery 2.

Figure 5:
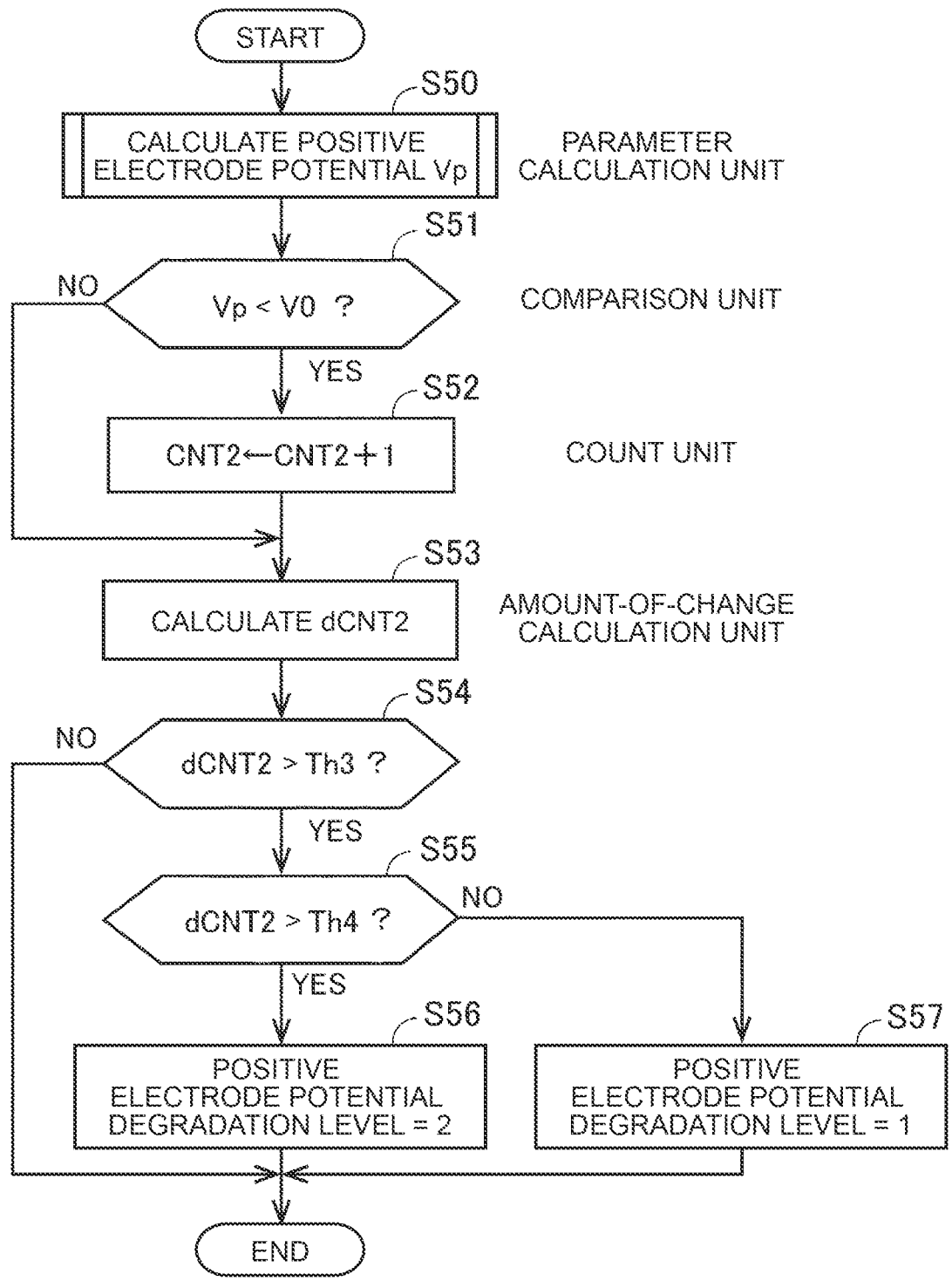
FIG. 5 is a flow chart showing the steps of the positive electrode potential degradation level determination process.

FIG. 5 is a flowchart illustrating a procedure of the positive electrode potential degradation level determination process. This procedure is performed, for example, by being called from the main routine at predetermined intervals.

In FIG. 5, first, in S50, the positive electrode potential Vp of the cell 3 is calculated. The positive electrode potential Vp of the cell 3 is calculated using, for example, the voltage Vb of the cell 3, the current IB, and the temperature Tb of the cell 3 detected by the monitoring unit 4, as described in Japanese Unexamined Patent Application Publication No. 2018-6029 (JP 2018-6029 A). The cell resistance R is obtained from the voltage Vb and the current IB. A positive electrode resistance Rp is obtained from a correspondence map between the temperature Tb and the positive electrode resistance Rp. The negative electrode resistance Rn is obtained from the difference between the cell resistance R and the positive electrode resistance Rp (Rn=R−Rp). The negative electrode potential Vn is calculated by adding the product of the current IB and the negative electrode resistance Rn to the negative electrode open potential OCVn (Vn=OCVn+Rn×IB). Then, the positive electrode potential Vp is calculated by adding the voltage Vb to the negative electrode potential Vn (Vp=Vn+Vb). The negative electrode open potential OCVn is determined in advance by experimentation or the like. The process of calculating the positive electrode potential Vp is performed for each cell 3 in the battery 2, and step S51 and the subsequent steps are performed for each of the positive electrode potentials Vp of the cells 3.

In S51, it is determined whether or not the positive electrode potential Vp is lower than a prescribed potential V0. The prescribed potential V0 is an example of the "threshold" of the present disclosure, and may be a predetermined positive electrode protective potential set in advance in consideration of a potential at which positive electrode degradation (elution of the conductive material in the positive electrode active material layer) may occur. When the positive electrode potential Vp is smaller than the prescribed potential V0, an affirmative determination is made and the process proceeds to S52. When the positive electrode potential Vp is equal to or higher than the prescribed potential V0, a negative determination is made, and the process proceeds to S53.

In S52, the count value CNT2 is incremented, and the process proceeds to S53. The initial value of the count value CNT2 is zero and is incremented every time S52 is executed. When the battery 2 is replaced, the count value CNT2 is reset to 0.

In S53, the amount of change dCNT2 in the count value CNT2 is calculated. The amount of change dCNT2 is an amount representing the slope of the count value CNT2. In the present embodiment, the count value CNT2 divided by the cumulative travel distance Mc of the vehicle 100 is calculated as the amount of change dCNT2 (dCNT2=CNT2/Mc). The amount of change dCNT2 may be an amount of increase in the count value CNT2 per predetermined travel distance. For example, when the count value CNT2 the certain travel distance Mo before the present time (this time) is CNT2o, the amount of change dCNT2 may be calculated as "dCNT2=(CNT2−CNT2o)/Mo." The amount of change dCNT2 may be the count value CNT2 divided by the cumulative usage time Tc of the battery 2 (dCNT2=CNT2/Tc). The amount of change dCNT2 may be an amount of increase in the count value CNT2 per predetermined usage time. For example, when the count value CNT2 the certain usage time To before the present time (this time) is CNT2to, the amount of change dCNT2 may be calculated as "dCNT2=(CNT2−CNT2to)/To."

In S54, it is determined whether the amount of change dCNT2 is larger than the threshold Th3. When the amount of change dCNT2 is larger than the threshold Th3, an affirmative determination is made and the process proceeds to S55. When the amount of change dCNT2 is equal to or less than the threshold Th3, a negative determination is made, and the current routine ends.

In S55, it is determined whether the amount of change dCNT2 is larger than the threshold Th4. The threshold Th4 is set to be larger than the threshold Th3 (Th4>Th3). When the amount of change dCNT2 is larger than the threshold Th4, an affirmative determination is made, and the process proceeds to S56, where the positive electrode potential degradation level of the battery 2 is set to "2," and the current routine ends. When the amount of change dCNT2 is equal to or less than the threshold Th4, a negative determination is made, and the process proceeds to S57, where the positive electrode potential degradation level of the battery 2 is set to "1," and the current routine ends.

Returning to FIG. 2, in S12, it is determined whether the ΔSOC degradation level obtained by S10 is equal to or higher than 1. When the ΔSOC degradation level is less than 1 (when the ΔSOC degradation level is not set), a negative determination is made and the process proceeds to S13. When the ΔSOC degradation level is equal to or higher than 1, an affirmative determination is made and the process proceeds to S15.

In S13, it is determined whether or not the positive electrode potential degradation level obtained by S11 is equal to or higher than 1. When the positive electrode potential degradation level is less than 1 (when the positive electrode potential degradation level is not set), a negative determination is made and the process proceeds to S14, and it is determined that the battery 2 is not degraded, and the present routine is ended. When the positive electrode potential degradation level is equal to or higher than 1, an affirmative determination is made and the process proceeds to S15.

In S15, it is determined whether or not the ΔSOC degradation level is 2. When the ΔSOC degradation level is not 2, the process proceeds to S16, where it is determined that the degradation state of the battery 2 is "degradation level 1," and the present routine ends. If the ΔSOC degradation level is 2, an affirmative determination is made and the process proceeds to S17.

In S17, it is determined whether or not the positive electrode potential degradation level is 2. When the positive electrode potential degradation level is not 2, the process proceeds to S16, where it is determined that the degradation state of the battery 2 is "degradation level 1," and the current routine ends. When the positive electrode potential degradation level is 2, an affirmative determination is made, and the process proceeds to S18, where it is determined that the degradation state of the battery 2 is "degradation level 2," and the current routine ends.

According to this embodiment, in FIG. 3, ΔSOC (SOC variation among the cells 3) is calculated in S30, ΔSOC and the threshold Rft are compared in S32, and when ΔSOC≥Rft, the count value CNT1 is incremented in S33. In S34, the amount of change dCNT1 in the count value CNT1 is calculated. When the amount of change dCNT1 is equal to or larger than the threshold Th2, the ΔSOC degradation level is set to "2," and when "S1<dCNT1<S2," the ΔSOC degradation level is set to "1" (S36 to S40).

In addition, in FIG. 4, the positive electrode potential Vp of the cell 3 is calculated by S50, and compared with the positive electrode potential Vp and the prescribed potential V0 by S51, and at the time of Vp<V0, the count value CTN2 is incremented by S52. In S53, the amount of change dCNT2 in the count value CNT2 is calculated. When the amount of change dCNT2 is equal to or larger than the threshold Th4, the positive electrode potential degradation level is set to "2," and when "S3<dCNT2<S4," the positive electrode potential degradation level is set to "1" (S54 to S57).

Then, in S16 from S12 of FIG. 2, when at least one of the ΔSOC degradation level or the positive electrode potential degradation level is "1," the degradation state of the battery 2 is diagnosed as "degradation level 1," and when the ΔSOC degradation level and the positive electrode potential degradation level are "2," the degradation state of the battery is diagnosed as "degradation level 2."

Figure 6:
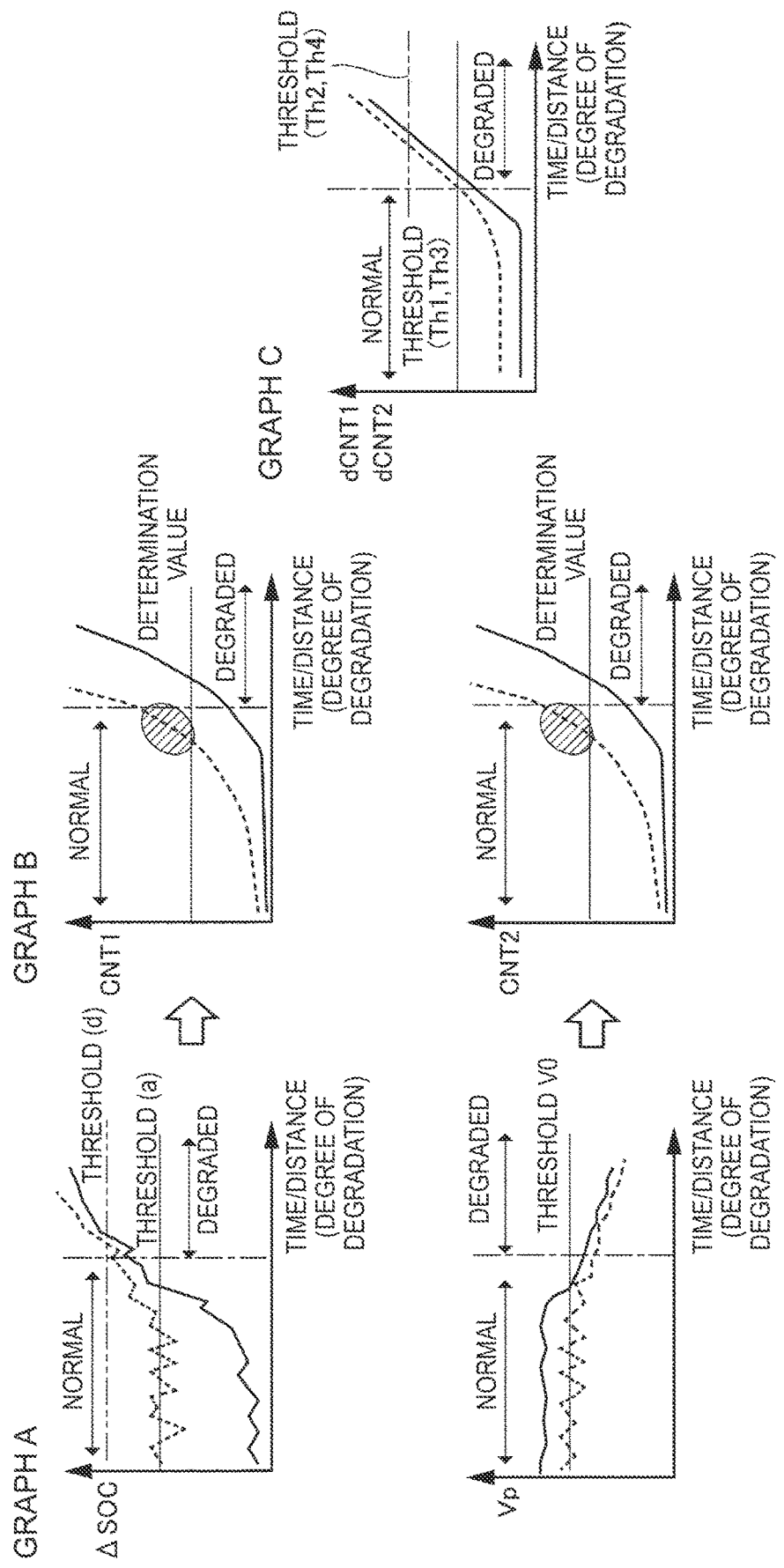
FIG. 6 is a diagram for explaining the degradation diagnosis of the battery based on the count values CTN1, CTN2 and the degradation diagnosis of the battery based on the amounts of change dCNT1, dCNT by graph A, graph B and graph C.

FIG. 6 is a diagram illustrating degradation diagnosis of the battery 2 based on the count values CTN1, CTN2 and degradation diagnosis of the battery 2 based on the amounts of change dCNT1, dCNT2. The upper part of graph A of FIG. 6 shows the change in ΔSCO, and the lower part of graph A of FIG. 6 shows the change in the positive electrode potential Vp. The upper part of graph B of FIG. 6 indicates the transition of the count value CTN1, and the lower part of graph B of FIG. 6 indicates the transition of the count value CTN2.

In the upper part of graph A of FIG. 6, a broken line represents a change in ΔSOC when the variation in the temperature Tb among the cells 3 in the battery 2 is large, and a solid line represents a change in ΔSOC when the variation in the temperature Tb is small. If the variation in the temperature Tb of the cell 3 is large, as indicated by a broken line, even if the battery 2 is not degraded, the ΔSOC may exceed the threshold (a), and as indicated by a broken line in the upper part of graph B of FIG. 6, even if the battery 2 is not degraded (even if the battery 2 is normal), the count value CTN1 becomes larger than the determination value, and as indicated by a diagonal line, there is a possibility that the degradation of the battery 2 is erroneously diagnosed. In the upper part of graph B of FIG. 6, the solid line indicates the transition of the count value CNT1 when the variation in the temperature Tb is small.

In the lower part of graph A of FIG. 6, a broken line represents a change in the positive electrode potential Vp when the vehicle 100 is operated so that the discharge amount of the battery 2 increases, and a solid line represents a change in the positive electrode potential Vp when the vehicle 100 is operated so that the discharge amount of the battery 2 falls within a predetermined range. When the vehicle 100 is operated so as to increase the discharge amount, as indicated by a broken line, even if the battery 2 is not degraded, the positive electrode potential VpΔ may be lower than the prescribed potential V0, and as indicated by a broken line in the lower part of graph B of FIG. 6, even if the battery 2 is not degraded (even if the battery 2 is normal), the count value CTN2 becomes larger than the determination value, and as indicated by a diagonal line, there is a possibility that the degradation of the battery 2 is erroneously diagnosed. In the lower part of graph B of FIG. 6, a solid line indicates a transition of the count value CNT2 when the vehicle 100 is operated so that the discharge amount of the battery 2 falls within a predetermined range.

Graph C in FIG. 6 shows the transition of the amount of change dCNT1, dCNT2. In graph C of FIG. 6, a broken line indicates the amount of change dCNT1 in the case where the variation in temperature Tb among the cells 3 is large, or the amount of change dCNT2 in the case where the vehicle 100 is operated so that the discharge amount of the battery 2 falls within a predetermined range. In the present embodiment, when the amount of change dCNT1 becomes larger than the threshold Th1 or when the amount of change dCNT2 becomes larger than the threshold Th3, it is determined that the battery 2 is degraded (since the degradation state is diagnosed as "degradation level 1"), erroneous diagnosis can be reduced, and the degradation of the battery 2 can be accurately diagnosed. In the present embodiment, when the amount of change dCNT1 becomes larger than the threshold Th2 and the amount of change dCNT2 becomes larger than the threshold Th4, it is diagnosed that the degradation state of the battery 2 is "degradation level 2," so that it can be determined that the degradation has progressed so much that the battery 2 needs to be replaced.

In the upper part of graph A of FIG. 6, the threshold (d) indicates the threshold Rtf=d in graph C of FIG. 4. The larger the variation in the temperature Tb among the cells 3 in the battery 2, the larger the threshold Rft is set to be. Therefore, even if the variation in the temperature Tb among the cells 3 is large, the frequency at which ΔSOC becomes larger than the threshold during normal operation of the battery 2 can be reduced, and the degradation of the battery 2 can be diagnosed more accurately.

In the above embodiment, S30 and S50 are an example of the "parameter calculation unit" of the present disclosure. S32 and S51 are an example of the "comparison unit" of the present disclosure. S33 and S52 are an example of the "count unit" of the present disclosure. S34 and S53 are an example of the "amount-of-change calculation unit" of the present disclosure. S12 to S18 are an example of the "diagnosis unit" of the present disclosure. The threshold Th1, Th2, Th3, and Th4 are examples of the "predetermined value" of the present disclosure.

Modification

In the above embodiment, in S35 of FIG. 3, when the amount of change dCNT1 is equal to or less than the previous value, the routine ends without setting the ΔSOC degradation level. When the cells 3 are nickel metal hydride cells or nickel cadmium cells, the amount of change dCNT1 has a decreasing tendency when the memory effect develops. However, when the amount of change in the count value is in the decreasing direction, it is estimated to be during the period from the memory effect developed until the memory effect is saturated, and since the degradation diagnosis of the battery 2 is not performed by S35, the erroneous diagnosis caused by the memory effect can be reduced.

In a variation, instead of or in addition to S35 process, the routine may be terminated without setting the ΔSOC degradation level until the cumulative travel distance Mc of the vehicle 100 reaches a predetermined distance. Accordingly, since the degradation diagnosis of the battery 2 is not performed during the period from when the memory effect develops until the memory effect is saturated, erroneous diagnosis due to the memory effect can be reduced. It should be noted that the routine may be terminated without setting the ΔSOC degradation level until the cumulative usage time Tc of the vehicle 100 reaches the predetermined time.

In the embodiment and the modification described above, the degradation state of the battery 2 is diagnosed using the SOC variation (ΔSOC) among the cells 3 in the battery 2 and the positive electrode potential Vp of the cell 3. However, there may be a configuration in which the monitoring unit 4 cannot detect the voltage Vb and the temperature Tb for each cell 3. For example, when the number of cells 3 in the battery 2 is 54, the battery 2 may be manufactured by preparing modules each including six cells 3 and connecting nine of the modules. The monitoring unit 4 can then be configured to detect the voltage Vmb per module and the temperature Tmb per module. In this case, an SOC variation among the modules in the battery 2 may be used instead of the SOC variation among the cells 3, and the positive electrode potential of the module may be used instead of the positive electrode potential of the cell 3. In this case, the degradation of the battery 2 can be diagnosed in the same manner as in the above embodiment. In this case, the module corresponds to the "cell" of the present disclosure.

When the voltage detectable by the monitoring unit 4 is the total voltage of the battery 2 and the temperature detectable by the monitoring unit 4 is the temperature of the battery 2, an SOC variation between or among the batteries 2 connected in parallel may be used instead of the SOC variation among the cells 3, and the positive electrode potential of the battery 2 may be used instead of the positive electrode potential of the cell 3. In this case, the degradation of the battery pack 1 can be diagnosed as in JP 2022-111574 A. In this case, the battery pack 1 corresponds to the "battery" of the present disclosure, and the battery corresponds to the "cell" of the present disclosure.

The embodiment disclosed herein should be considered as illustrative and not restrictive in all respects. The scope of the present disclosure is shown by the claims, rather than the above embodiment, and is intended to include all modifications within the meaning and the scope equivalent to those of the claims.

What is claimed is:

1. A battery system mounted in a vehicle, comprising:
   a battery composed of a plurality of cells connected together;
   a monitoring circuit to monitor a voltage of each cell and a current flowing through the battery; and
   a diagnostic processor coupled to the monitoring circuit to receive monitored values of the voltage and current, wherein
   the diagnostic processor is programmed to
      repeatedly calculate a state-of-charge variation value among the cells over time based on the monitored values of the voltage and current,
      responsive to each calculation of the state-of-charge variation value:
         compare the calculated state-of-charge variation value with a threshold,
         increment a count value when the comparison indicates that the calculated state-of-charge variation value is larger than the threshold,
         calculate a slope value of the count value, the slope value being calculated by dividing the count value by a cumulative travel distance of the vehicle or dividing the count value by a cumulative usage time of the battery, and
         diagnose that the battery is degraded in response to determining that both of the following conditions are met: (1) the slope value is equal to or larger than a predetermined value, and (2) the slope value is not decreasing over time in response to a decrease in open-circuit voltages of the cells due to memory effect.

2. The battery system according to claim 1, wherein the diagnostic processor is further programmed to calculate a temperature variation among the cells and set the threshold based on the temperature variation.

* * * * *